(12) United States Patent
Tazzari et al.

(10) Patent No.: US 8,015,316 B2
(45) Date of Patent: Sep. 6, 2011

(54) METHOD AND SYSTEM FOR DETECTING MESSAGES IN THE PRESENCE OF NOISE

(75) Inventors: Davide Tazzari, Arezzo (IT); Filippo Vernia, La Spezia (IT)

(73) Assignee: Power-One Italy S.p.A., Arezzo (IT)

( * ) Notice: Subject to any disclaimer, the term of this patent is extended or adjusted under 35 U.S.C. 154(b) by 722 days.

(21) Appl. No.: 11/911,358

(22) PCT Filed: Apr. 12, 2005

(86) PCT No.: PCT/IT2005/000202
§ 371 (c)(1),
(2), (4) Date: Jun. 13, 2008

(87) PCT Pub. No.: WO2006/109327
PCT Pub. Date: Oct. 19, 2006

(65) Prior Publication Data
US 2009/0132650 A1    May 21, 2009

(51) Int. Cl.
*G06F 15/173* (2006.01)
*G06F 15/16* (2006.01)
(52) U.S. Cl. ......... 709/238; 709/230; 709/231; 709/232
(58) Field of Classification Search .......... 709/230–232, 709/238
See application file for complete search history.

(56) References Cited

U.S. PATENT DOCUMENTS

| | | | |
|---|---|---|---|
| 5,128,945 A | | 7/1992 | Enns et al. |
| 6,065,119 A | * | 5/2000 | Sandford et al. ................. 726/22 |
| 6,212,183 B1 | * | 4/2001 | Wilford ........................ 370/392 |
| 6,212,660 B1 | | 4/2001 | Joeressen et al. |
| 6,345,301 B1 | * | 2/2002 | Burns et al. .................... 709/230 |
| 6,415,412 B2 | | 7/2002 | Tonks |
| 6,424,650 B1 | * | 7/2002 | Yang et al. .................... 370/390 |
| 6,842,433 B2 | * | 1/2005 | West et al. .................... 370/312 |
| 7,325,059 B2 | * | 1/2008 | Barach et al. ................. 709/225 |
| 7,640,339 B1 | * | 12/2009 | Caronni et al. ............... 709/224 |
| 7,725,595 B1 | * | 5/2010 | Geissler et al. ............... 709/235 |
| 7,730,209 B2 | * | 6/2010 | Greeff .......................... 709/245 |

* cited by examiner

*Primary Examiner* — Hussein A Elchanti
(74) *Attorney, Agent, or Firm* — Waddey & Patterson; Mark J. Patterson (57) ABSTRACT

Disclosed is a method for transmitting messages between a transmitter and a receiver on a channel on which noise may be present. The messages are constituted by a sequence of data and comprise an initial portion (header) containing data to allow recognition of the message, a central portion (body) containing the valid message to transmit and an end portion (tail) containing information to verify the completeness of the message. The method consists in inserting in the message header a signature obtained from the combination of a first fixed part and of a second validation part; and recognizing a valid message received by verifying whether the fixed part of the message received generates the same validation part.

11 Claims, 5 Drawing Sheets

STATE-OF-THE-ART

METHOD AND SYSTEM FOR DETECTING MESSAGES IN THE PRESENCE OF NOISE

TECHNICAL FIELD

This invention relates in general to the technique to transmit messages on a channel, between a transmitter and a receiver. More specifically, although not exclusively, this invention relates to the transmission of messages by means of carrier waves on a power line.

Specifically, the invention relates to the technique to recognize messages transmitted on a channel in the presence of noise.

PRIOR ART

In an environment in which a receiver is unable to distinguish whether signals received are part of a message, as the sensitivity of the receiver is inferior both to the power of the signal and to that of the noise (or because the receiver uses an AGC—Automatic Gain Control), it is necessary to provide a technique which allows the receiver to recognize, i.e. to detect the message, distinguishing it from the noise present on the transmission channel.

In general, the message is composed of three zones: a header or initial portion, a body or central portion and a tail or end portion.

The header contains all the information related to synchronism and the identification, i.e. the transport data necessary to identify the message and make it travel in the network to the recipient. The body contains the valid message to be sent (payload) and the tail contains information required to validate the message. This information is generally defined as "checksum" and is the result of a mathematical operation performed on the previous part of the message by applying a specific algorithm. The checksum is a validation part of the message, indicating whether the message received is complete and the same as the message transmitted, or if it has undergone deterioration during transmission. Validation algorithms are known per se and will not be described in detail herein. The term checksum or validation is intended herein to include in general any algorithm having this function of verifying the completeness of the message and must not be interpreted as limited to a specific type of algorithm.

For the receiver, which from the channel on which the data flow receives an essentially uninterrupted sequence of data constituted by valid messages but also by noise, the problem is understanding where the valid message starts inside the flow of data which arrive continuously from the reception channel.

The signal on the channel on which the messages transit is filtered (at the base frequency thereof and sampled to obtain a continuous flow of bits. Normally, these are noise bits (especially when an AGC is used), and every so often they represent a message. Therefore, the problem is recognizing the message in the flow of bits generated by the sampled and digitalized flow entering the receiver.

Currently, the problem is solved using a sequence recognizer. The flow of bits entering the receiver is made to travel in a buffer shift register containing the same number of bits as the number of bits of a known "signature" identifying the header of the message, for example, a sequence of the type 110011001100110011.

Each time a new bit coming from the reception channel enters the shift register, the oldest bit is expelled and the sequence of bits stored is compared with the fixed "signature" represented by the sequence of bits known as indicative of the start of a valid message. When the bits received represent exactly the signature identifying a valid message, it can be reasonably said that the start of a message has been identified. The subsequent bits are the remaining part of the message.

Operation of this type of recognizer is based on a probability evaluation: it is extremely improbable that noise will generate a sequence of bits corresponding exactly to the sequence which constitutes the fixed "signature" identifying valid messages.

The recognition process described above is summed up in the diagram in FIG. 1. The input bits, which can be constituted by a message or by noise bits, are input in sequence into the shift register. At each clock pulse a new bit is input into the shift register and the oldest bit is output from the register. The sequence of bits contained in the register is compared in a comparator with a fixed signature, constituted by a sequence of bits the same length as the length of the sequence temporarily stored in the shift register. When the two sequences coincide a synchronism signal is generated, indicating that the sequence of bits stored in the shift register represents the start of a valid message. The receiver then receives the message, of known length, and upon complete reception also of the tail containing the checksum, performs message validation in a known way, applying to the message the algorithm for generation of the checksum.

Figure 1:
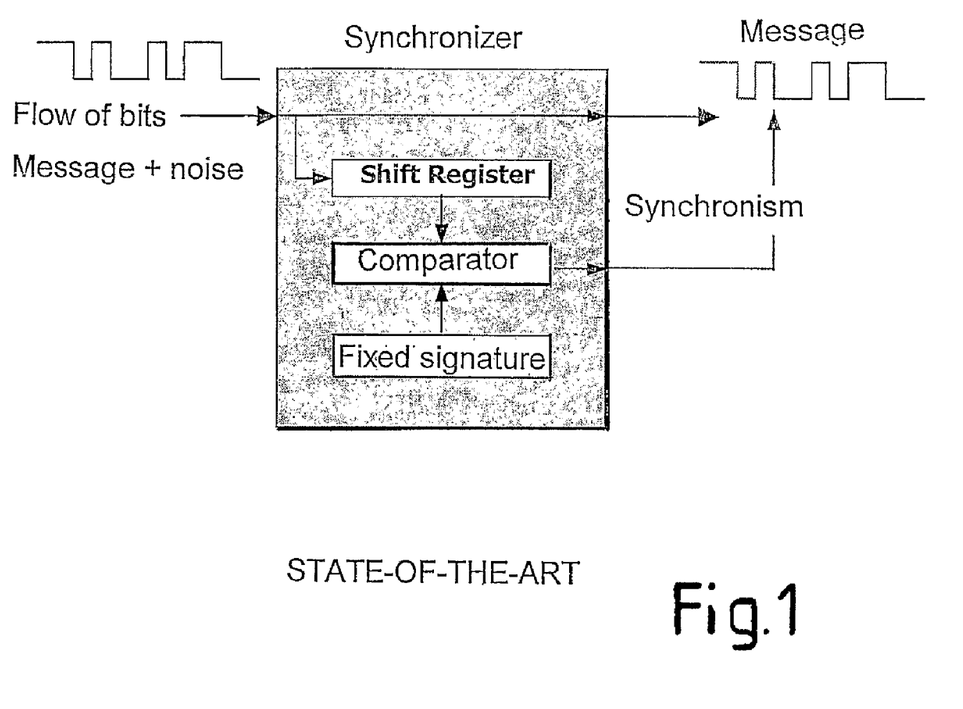
FIG. 1 shows a block diagram of a traditional recognition system.

The certainty that the message is actually valid is not obtained until the message has been completely received and the checksum (located at the end of the message) has been used to check whether it is actually a valid and not a deteriorated message, or whether noise has generated a sequence which only by chance coincides with the expected signature. The longer the expected sequence (signature) is, the more difficult it is for noise to generate a spurious message. The probability of noise generating a similar sequence is ½" where n is the length, expressed in bits, of the sequence defining the signature.

As the receiver uses a PLL to remain locked to the frequency of the carrier wave, it is fundamental that the sequences of bits received are not continuous series of identical bits. It is therefore necessary for the signature to have a good "alternation" between 0 and 1.

This method is not sufficiently effective when the messages transmitted are on a channel with a great deal of noise. For example, it does not allow a high level of efficiency and security to be obtained in the case of transmission of data on a power line by means of carrier waves.

Moreover, when in a complex system with one or more nodes which transmit messages and one or more nodes which receive messages, it is not possible, unless by using complex reprogramming operations, to differentiate the signatures of messages to be sent to some selected nodes from one another.

OBJECTS AND SUMMARY OF THE INVENTION

The object of this invention is to produce a method to recognize messages in the presence of noise which is more efficient than prior art methods.

The object of an improved embodiment of the invention is to produce a recognition method which makes the illegal interception of messages more difficult.

The object of a further embodiment of the invention is to produce a method which allows messages to be sent selectively to one or more receivers selected from a plurality of receivers and to modify, in a simple manner, a system with different nodes to which it might be necessary to send messages selectively.

Essentially, according to a first aspect the invention relates to a method for detecting messages in the presence of noise, wherein a message emitted from a transmitter is detected by a receiver on the basis of a sequence of data at the start of said message, and wherein the sequence of data comprises a sequence of fixed data and a sequence of validation data generated by the transmitter by applying a validation key to the sequence of fixed data. The message is recognized by the receiver by applying the same validation key to the fixed sequence, verifying that this key generates a validation sequence the same as the validation sequence contained in the message received.

In substance, while in known recognition methods the message is recognized as such by comparing the initial sequence of bits with a known and fixed sequence, according to the invention a validation key is applied to a sequence of data in the header of the message, which generates a validation sequence and said key is applied in the reception phase to recognize the valid message, distinguishing it from the signal generated by noise.

In practice, the recognition signature of the message contains a validation portion generated with a checksum algorithm or the like, of the type normally used to verify completeness of a message, and which generates the validation field contained in the tail of the message.

Besides allowing greater security in recognition of messages, the method according to the invention is intrinsically more secure with regard to any illegal interception of the messages. In fact, a message cannot be recognized as such if the person intercepting it does not know the key with which the validation field in the message header has been generated.

According to a different aspect, the invention relates to a method for transmitting messages between a transmitter and a receiver on a channel on which there may be noise, wherein said messages are constituted by a sequence of data and comprise a header containing data to allow recognition of the message, a body containing the valid message to be transmitted and a tail containing information to verify the completeness of the message; and wherein the receiver recognizes said messages by means of data contained in said header. According to the invention, the method is characterized by:
  inserting in the message header a signature obtained from the combination of a first fixed part and of a second validation part;
  and recognizing a valid message received by verifying whether the fixed part of the message received generates the same validation part.

A practical embodiment of the transmission method according to the invention may include the steps of:
  transmitting a message, the header of which contains a fixed part, constituted by a first sequence of data, and a validation part, constituted by a second sequence of data obtained by applying a validation key to the data forming the first sequence;
  and recognizing a message received from said receiver by applying the same validation key to the first sequence of data of the message received to generate with said key a third sequence of data and comparing the third sequence of data with the second sequence of data contained in the message received, the message being recognized when the third sequence of data and the second sequence of data coincide.

In practice, messages can be transmitted by means of a system using carrier waves on a transmission channel constituted, for example, by a power line. On channels of this type there is frequently a high degree of noise which makes recognition of valid messages difficult. Moreover, the risk of abusive interception is high.

According to a further aspect, the invention relates to a message transmission system, comprising at least one transmitter and one receiver connected to each other by a transmission channel, wherein:
  said transmitter is programmed to transmit on said channel messages comprising a header containing data to allow recognition of the message, a body containing the valid message to transmit and a tail containing information to verify the completeness of the message;
  said receiver is programmed to receive on said channel sequences of data and recognize a valid message by means of the data contained in said header; characterized in that: said transmitter is programmed to insert in the initial portion of the message a signature obtained from combination of a first fixed part and of a second validation part; and in that said receiver is programmed to recognize a valid message received by verifying whether the fixed part of the message received generates the same validation part.

Further advantageous characteristics of the method and of the transmission system according to the invention are indicated in the appended claims.

BRIEF DESCRIPTION OF THE DRAWINGS

The invention shall now be better understood by following the description and accompanying drawing, which shows a non-limiting practical embodiment of the invention. More specifically, in the drawing.

DETAILED DESCRIPTION OF A PREFERRED EMBODIMENT OF THE INVENTION

Figure 2:
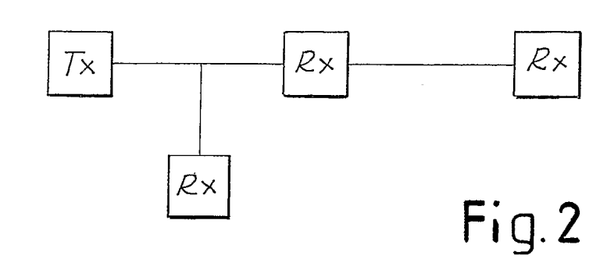
FIG. 2 shows a simplified diagram of a system in which this invention can be used.

FIG. 2 schematically represents a system comprising a transmitter Tx and a series of receivers Rx, connected by a network, which can for example be a power distribution network and which represents the physical channel for the transmission of messages from the transmitter to the receivers. Each transmitter and receiver in this case has a PLM (Power Line Modem) to transmit and/or receive sequences of data constituting messages on the channel formed by the power line.

It must be understood that in actual fact each element Rx and Tx represented can perform both the function of receiver and that of transmitter. For example, the element Tx can send a message to one of the receivers Rx, which has the task of generating in turn a response message towards the transmitter. Therefore, in the response phase Rx will be the transmitter and Tx the receiver. Moreover, when the message is sent to a receiver at a distance from the transmitter, the intermediate elements can be employed to generate echoes of the transmitted message and therefore behave both as receivers and as transmitters.

In this description and in the appended claims, therefore, the terms receiver and transmitter must not be intended as referring to elements which have solely the function respectively of receiving messages and of transmitting messages, but indicate an element which instantaneously behaves as a receiver or as a transmitter for a specific message.

The messages to transmit are in general composed of sequences of bits which are converted into an analog signal by modulating a carrier wave transmitted on the transmission channel. In the reception phase the message contained in the carrier wave is decoded and transformed into a sequence of bits by sampling and digitalizing the analog signal on the carrier wave. This all takes place according to techniques known to those skilled in the art.

Figure 4:
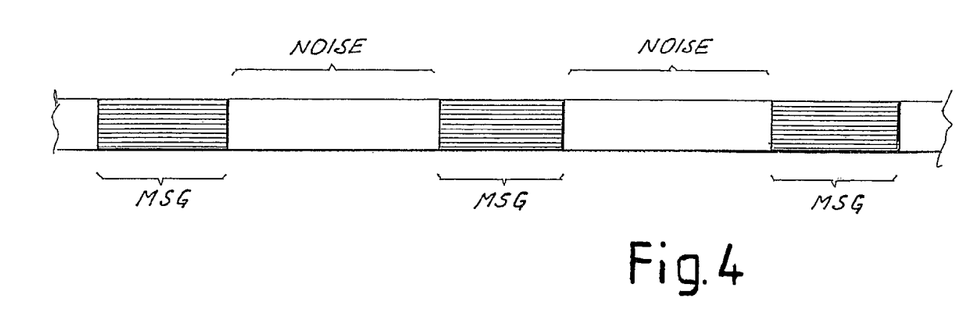
FIG. 4 shows a succession of messages inside a flow of bits on a reception channel.
Figure 5A:
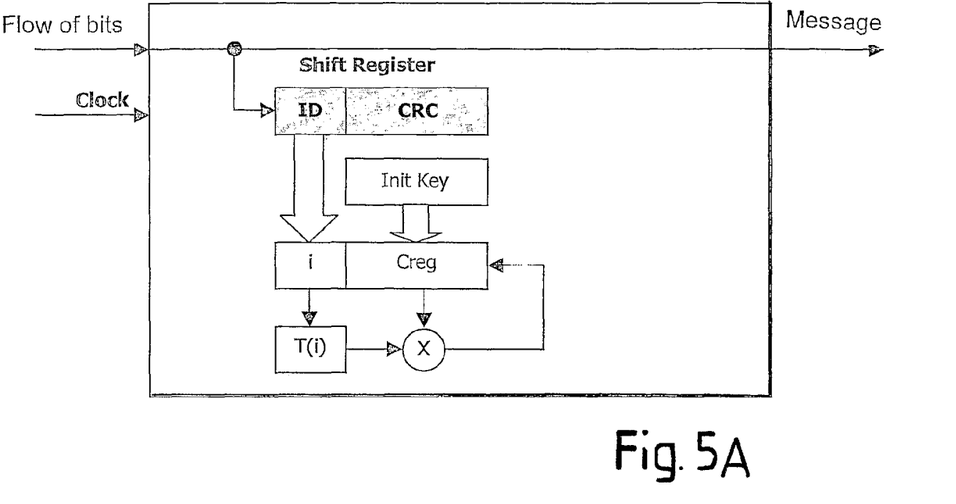
FIGS. 5A-5D show diagrams of the recognition algorithm according to this invention.
Figure 5B:
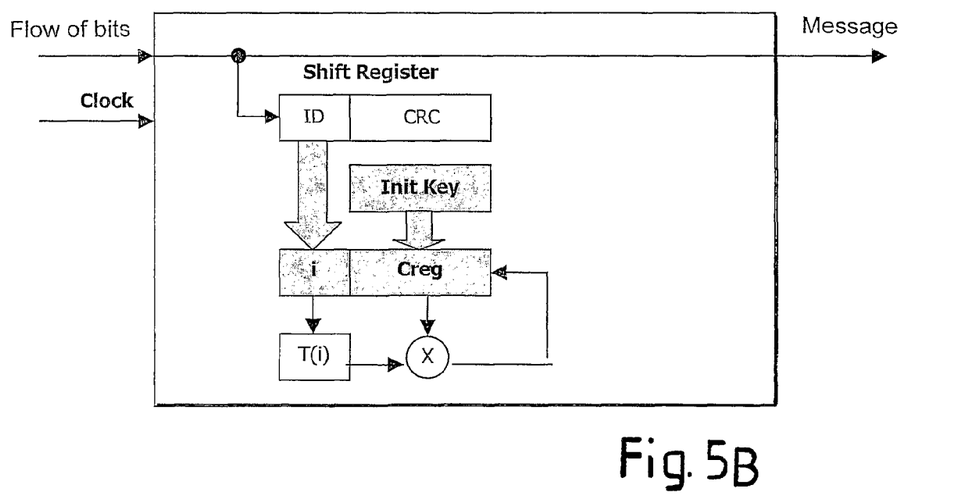
Figure 5C:
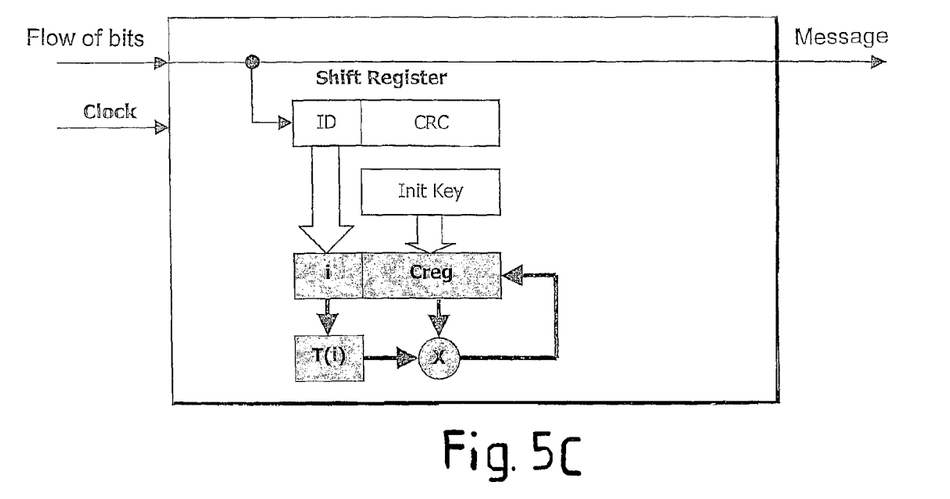
Figure 5D:
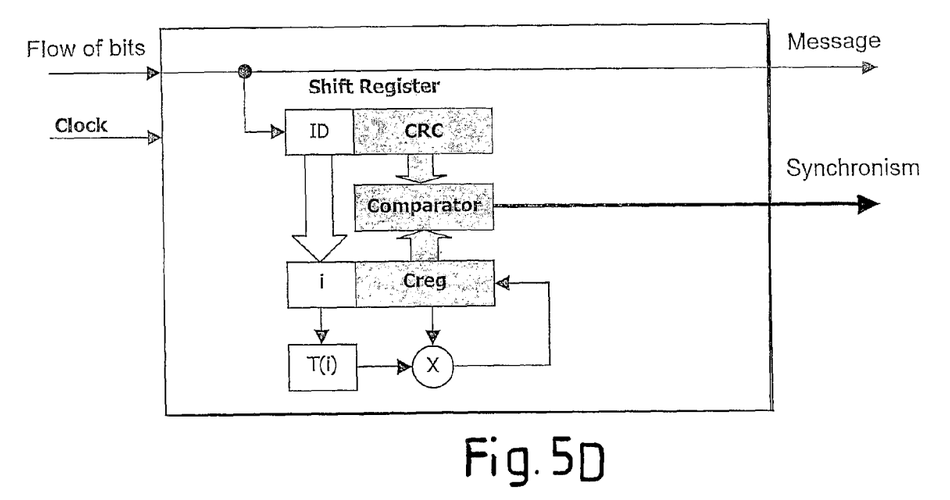

If there is noise on the transmission channel, during the reception phase this will give rise to the generation of a sequence of bits which will enter the receiver in series to the sequences of bits of useful messages. In practice, the receiver sees on the reception channel a sequence of the type schematized in FIG. 4, where sequences of data forming useful messages, indicated with MSG, are separated from sequences of data produced by the background noise and indicated with NOISE.

Figure 3:
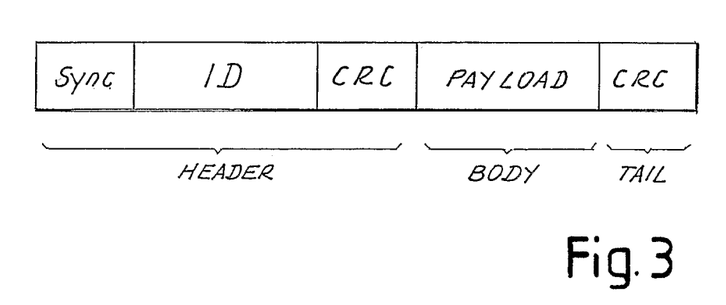
FIG. 3 schematically shows the structure of a message constituted by a sequence of bits divided into the various portions which form the complete message.

To allow the receiver to recognize a valid message distinguishing it from the noise, the message MSG has the form schematized in FIG. 3. It has a header, a body and a tail. The body contains the useful part of the message, namely the "payload", while the tail contains a validation code or "checksum", obtained with a CRC or other equivalent algorithm.

Characteristically, according to the invention, the header of the message contains at least a fixed part indicated with ID formed of a fixed sequence of bits, followed by a validation part, indicated with CRC and in practice containing a checksum, i.e. a sequence of bits obtained by applying a validation algorithm, such as a CRC algorithm, to the sequence of bits forming the fixed ID part. The latter typically contains data having, among other things, the function of indicating the recipient of the message.

It must be understood that CRC (Cyclic Redundancy Check) is intended in this context as any algorithm capable of generating, from a series of data by means of a known law and a validation key, a sequence of data (CHECKSUM) with a logic whereby two series of data which differ even by only one bit give rise to two essentially different checksums, that is, which differ from each other by a greater number of bits. This makes it possible to distinguish between two different messages or between a message and a series of bits generated by noise more efficiently with respect to techniques which use a fixed signature.

The calculation principles and techniques on which CRC algorithms are based are known to those skilled in the art and do not require specific description herein.

Therefore, in practice the message MSG is characterized by a variable or dynamic signature and no longer by a fixed signature. The dynamic signature is composed of the fixed part (ID) and by the validation part (CRC). The combined use of these two elements makes it possible to prevent false recognitions caused by noise. In fact, the CRC is designed so as to amplify errors: for each different bit between two IDs there will be corresponding CRCs with a great many different bits. The "distance" between two valid signatures will therefore be sufficient to guarantee immunity to noise above standard (choosing the IDs at random).

In the diagram in FIG. 3, the message header also contains a portion indicated with SYNC, which contains an alternate sequence of bits "1" and "0" which, for example, are used to lock the PLL of the receiver, which uses this PLL to remain locked to the frequency of the carrier wave. In actual fact, the portion SYNC and the portion ID can be constituted by a single sequence of bits forming the fixed part of the dynamic signature, the checksum being calculated by means of the CRC algorithm on this sequence of bits (SYNC and ID). In other words, the fixed part of the dynamic signature (formed of fixed part and checksum) can constitute the synchronism sequence for locking of the PLL.

It is clear that the validation part, indicated with CRC, of the message header cannot be generated by the recipient of the message by reading the fixed ID part of the message header, if the validation key used, for example typically a polynomial of the CRC algorithm, is not known. This makes the message recognition system according to the invention more secure. In practice, without knowing the validation key, interception of the messages is impossible, as whoever listens to the channel is unable to identify the message header distinguishing it from the noise present on the channel or distinguishing one message from another.

In fact, the receiver identifies the header of a valid message in a sequence of bits received on the reception channel, if, by applying to a number of bits (the same as the number of bits forming the fixed ID part) the validation key known and the same as the one used by the transmitter to generate the validation part CRC of the header, it obtains the same sequence of bits contained in the CRC portion of the header of the message received.

Therefore, in practice, the signature of the message is "self-validating", in the sense that by varying the initial fixed ID part of the message transmitted, any receiver knowing the validation key is still able to recognize the message.

This makes it possible to provide a family of signatures, each identified by a different sequence of bits in the fixed ID part of the message header. The decision to use a new signature to transmit messages from a transmitter, characterized by a different sequence of bits in the fixed ID part, can be made at any moment. Without requiring to be reprogrammed, all the receivers are still able to recognize a message of this type, as recognition is obtained by applying the validation key (which remains the same) to the message header received and verifying that by applying said validation key to the message ID the same CRC as the header is obtained.

In traditional systems, in which the message recognizer recognizes a valid message by means of a fixed signature, if the transmitter is reprogrammed to transmit messages with a new signature, no receiver is able to recognize this new message unless it is reprogrammed to compare the fixed signature of the message with a new fixed signature of comparison. Moreover, if different signatures are used for different messages, each receiver which must recognize a valid message irrespective of the signature contained therein would have to compare it with a plurality of fixed signatures.

FIGS. 5A-5D describe in greater detail the recognition method of the message implemented by the receiver to recognize a valid message characterized by a dynamic signature containing the fixed ID part and the validation CRC part.

In practice, the algorithm includes the following steps. The receiver has a shift register of a length the same as the length of the fixed ID part (or SYNC+ID) and of the validation CRC part of the header of the message MSG. This register is divided into a first portion (again indicated with ID) of a length the same as to the length of the ID part of the message header, that is, containing a number of bits the same as the number of bits which constitute the fixed part of the signature; and into a second portion (indicated with CRC) of a length the same as the length of the validation CRC part of the header of the message MSG.

At each clock pulse a new bit of the flow of incoming bits on the reception channel is loaded in the shift register (FIG. 5A), expelling the oldest bit from said register.

In the subsequent step (FIG. 5B) the receiver copies the content of the ID part of the shift register into a work register and an initial key "Init Key" into a results register "Creg". Typically, as known to those skilled in the art, the initial key is constituted by a sequence of bits equal to "1".

In the subsequent step (FIG. 5C) the checksum of the message is calculated by applying the CRC algorithm using the same key (that is, the same polynomial) which was used by the transmitter to generate the validation CRC part of the message header.

After having applied the validation algorithm on the fixed part ID of the header of the message MSG, a validation code, or validation part, or checksum, is obtained in the results register, constituted by a sequence of bits. If this sequence is the same as the sequence of bits forming the validation CRC part of the message stored in the CRC portion of the shift register, this means that the last bit loaded in this shift register represents the last bit of the header of a valid message recognized by the receiver. If, on the other hand, two different sequences are present in the work register Creg and in the CRC part of the shift register, this means that a valid message is not present. In the step schematized in FIG. 5D, this comparison is made between the content of the two registers and, if the result of comparison is affirmative, a synchronism signal is generated and the receiver starts to receive the message recognized as valid.

It is clear from the above description that the receiver does not recognize the validity of a message by comparing a fixed sequence of bits (contained in the ID part) with a fixed signature, but by applying a known validation algorithm to said fixed part, with a validation key the same as the one used to generate the validation part of the message header.

Consequently, as already mentioned, the receiver is able to recognize messages characterized by different sequences of bits in the ID portion. If the transmitter uses a new ID sequence not yet used, nothing must be done so that the receiver can recognize as valid a message characterized by said new ID sequence: it will recognize the message as valid distinguishing it from the noise thanks to the validation key. By applying the same validation algorithm to the new ID sequence it will verify that the result coincides with the result stored by the transmitter in the CRC portion of the message header.

Moreover, a difference of only one bit in the fixed ID sequence of two messages generates an essential difference (that is, a difference of several bits) in the validation part. The receiver is therefore able to distinguish two messages with two different IDs more effectively and is also able to distinguish a valid message from a string of bits generated by the noise more effectively, even if there is a difference of only one bit between a valid ID and a random string of noise bits.

The importance of the "self-validating" signature can be better understood by means of the following example, described with reference to the diagram in FIG. 6. In this figure, on a network 10, which also constitutes the transmission channel of the messages, a transmitter TX is connected to a plurality of receivers RX, divided into groups, distinguished by the letters A, B and C. For example, the receivers A, B and C can be associated with different types of appliances connected to a power distribution network.

It may be necessary for the transmitter TX to send "broadcast" messages addressed to all the receivers RX without distinction, or messages addressed to all receivers of the group A, or of the group B or the group C, or yet again messages can be addressed to a single receiver.

The fixed ID part identifying the message will then contain a sequence of bits which will identify the type of message and/or the recipient. For example, a sequence of four initial bits of the ID part can be used as follows:
11111000=broadcast message addressed to all the receivers
11110000=message addressed to the receivers of group A,
11101000=message addressed to the receivers of group B;
11011000=message addressed to the receivers of group C;
10001110=message addressed to a single receiver, the address of which is defined by the sequence 111.

Each message, irrespective of the sequence of initial bits of the fixed ID part, is recognized by any receiver as a valid message by means of the validation procedure described above, as by applying the same validation key used by the transmitter to generate the CRC of the message header the generic receiver will obtain the same result in the results register. Once the synchronism message has been generated (FIG. 5D), the processor of the receiver will interpret the message and verify whether it is a broadcast message, or a message addressed to it or to another receiver and will perform the operations required in the specific case.

Figure 6:
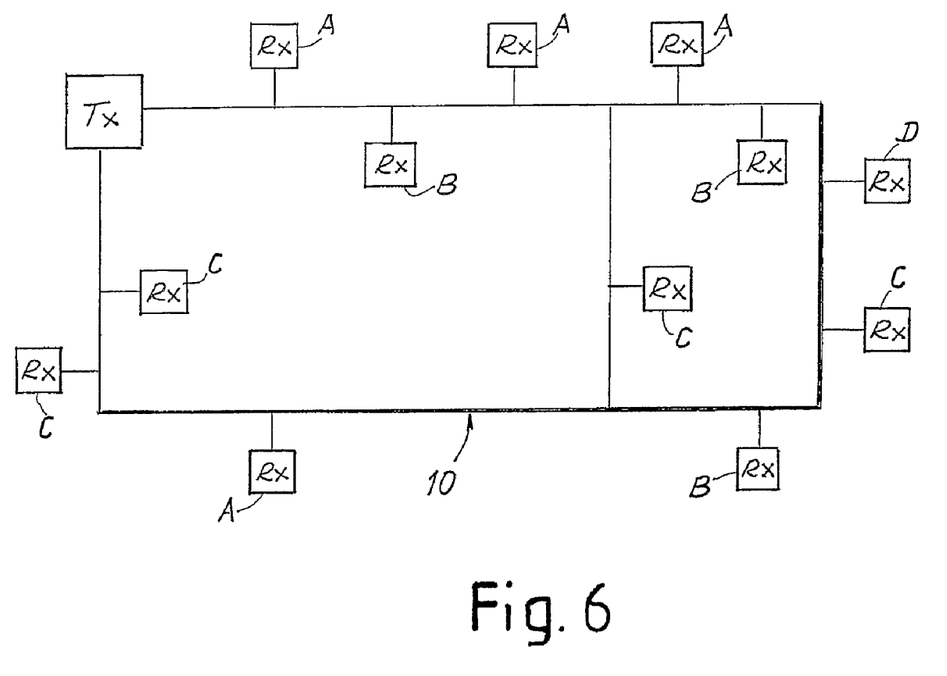
FIG. 6 shows a diagram of a network formed of a transmitter and of a series of receivers divided into groups, to which messages can be sent selectively.

When a new group of receivers, indicated with D in FIG. 6, is added to the network, it is sufficient to add a new sequence of bits (for example 10111000), to identify messages addressed solely to receivers of that group. Messages characterized by this sequence are in any case recognized as valid messages by all the receivers of groups A, B and C, even if the messages are not addressed to them, thanks to the fact that the signature is "self-validating". This, for example, means that the various receivers A, B, C can be used to generate echoes of messages recognized as valid and addressed to the receivers of group D.

It is understood that the drawing purely shows a practical embodiment of the invention, which may vary in forms and arrangements without however departing from the scope of the concept on which the invention is based.

What is claimed is:

1. A method for transmitting messages between a transmitter and a receiver on a communications channel on which there may be noise, wherein said messages comprise a message header containing header data to allow recognition of the message, a message body containing message data to be transmitted, and a message tail containing verification information to verify completeness of the message, and wherein the receiver recognizes said messages by means of header data contained in said message header, the method comprising the steps of:

generating the message to be transmitted;
inserting in the message header a message signature comprising a fixed part and a validation part;
transmitting the message on the communications channel to the receiver; and
recognizing that a valid message has been received by verifying whether the fixed part of the message signature received generates in the receiver a message validation sequence that is the same as the validation part of the message signature;
wherein the fixed part of the message signature comprises a first sequence of data, and the validation part of the message signature comprises a second sequence of data obtained by applying a validation key to the first sequence of data;

the step of recognizing that a valid message has been received further comprises applying the validation key to receiver a third sequence of data; and the step of recognizing that a valid message has been received further comprises comparing the third sequence of data with the second sequence of data contained in the message received, the message being recognized when said third sequence of data and said second sequence of data coincide.

2. The method of claim 1, wherein said validation part of the message signature is obtained by applying a validation key in the transmitter, said validation key also being used by the receiver to generate the message validation sequence used to recognize said message.

3. The method of claim 1 wherein said validation part of the message signature is obtained using a combination of a CRC algorithm and a validation key applied to the fixed part of the message signature.

4. The method of claim 3 wherein the step of transmitting said message comprises transmitting the message on a power distribution network by means of carrier waves.

5. The method of claim 4 wherein the message header further comprises synchronization data.

6. The method of claim 5, wherein said synchronization data is contained in the fixed part of the message signature.

7. The method of claim 6 wherein the message header contains further comprises address data to address the message to at least one pre-determined recipient.

8. A message transmission system comprising:
at least one transmitter and one receiver coupled by a transmission channel, said transmitter is functional to transmit messages on said channel, said messages each comprising a header containing header data to allow recognition of the message, a message body containing valid message data to be transmitted, and a message tail containing information to verify completeness of the message;

said receiver is functional to receive said messages on said channel and to recognize a valid message using the header data;

said transmitter is further functional to insert in the message header a message signature, the message signature comprising a fixed part and a validation part; and said receiver is further functional to recognize a valid message received by verifying whether the fixed part of the message signature received generates in the receiver a validation sequence that corresponds to the validation part of message signature;

said transmitter is further functional to transmit a message, wherein the fixed part of the message signature comprises a first sequence of data, and the validation part of the message signature comprises a second sequence of data obtained by applying a validation key to the first sequence; and said receiver is further functional to recognize a valid message received by applying the validation key to the first sequence of data of the message received to generate with said key a third sequence of data, and by comparing the third sequence of data with the second sequence of data contained in the message received, the message being recognized when said third sequence of data and said second sequence of data coincide.

9. The system of claim 8, wherein:
said transmitter is further functional to generate said validation part of the message signature by applying a validation key; and the receiver is further functional to apply the validation key to recognize said message.

10. The system of claim 8, wherein:
said channel is a power distribution network; and in that said at least one transmitter and said at least one receiver communicate on said channel by means of carrier waves.

11. The system of claim 10, wherein said transmitter is functional to insert in the message header a sequence of synchronization data, and said receiver is functional to recognize said sequence of synchronization data.

* * * * *